United States Patent [19]

Kim et al.

[11] Patent Number: 5,696,436
[45] Date of Patent: Dec. 9, 1997

[54] METHOD AND SYSTEM FOR BATTERY CHARGING

[75] Inventors: Sang Hoon Kim, Hoffman Estates; Andrew V. Schultz, Mt. Prospect, both of Ill.

[73] Assignee: Motorola Inc., Schaumburg, Ill.

[21] Appl. No.: 540,619

[22] Filed: Oct. 27, 1995

[51] Int. Cl.[6] .................................................. H02J 7/04
[52] U.S. Cl. .................... 320/22; 320/35; 320/39
[58] Field of Search ................................. 320/21, 22, 23, 320/31, 35, 36, 38, 40, 43, 48, 39

[56] References Cited

U.S. PATENT DOCUMENTS

| 4,710,694 | 12/1987 | Sutphin et al. | 320/21 |
|---|---|---|---|
| 4,965,738 | 10/1990 | Bauer et al. | 364/483 |
| 5,049,804 | 9/1991 | Hutchings | 320/20 |
| 5,157,320 | 10/1992 | Kuriloff | 320/39 |
| 5,367,244 | 11/1994 | Rose et al. | 320/23 |
| 5,534,765 | 7/1996 | Kreisinger et al. | 320/30 |
| 5,561,360 | 10/1996 | Ayres et al. | 320/14 |
| 5,565,759 | 10/1996 | Dunstan | 320/48 |
| 5,572,110 | 11/1996 | Dunstan | 320/30 |

*Primary Examiner*—Peter S. Wong
*Assistant Examiner*—Gregory J. Toatley, Jr.
*Attorney, Agent, or Firm*—Michael L. Smith

[57] ABSTRACT

A method and system (400) for controlling battery charging including applying a predetermined voltage to a battery (500) to be charged, increasing the voltage applied to the battery (500) to a known maximum battery charging voltage, measuring a current supplied to the battery (500) at the maximum battery charging voltage, supplying a predetermined set of constant current charging levels, and setting a charging current level equal to one of the set of predetermined constant current charging levels based on the current supplied to the battery at the maximum battery charging voltage for minimizing an amount of time needed to charge the battery (500) and maximizing a useful life of the battery (500).

13 Claims, 3 Drawing Sheets

5,696,436

METHOD AND SYSTEM FOR BATTERY CHARGING

FIELD OF THE INVENTION

This invention is generally directed to the field of battery charging, and specifically to battery charging of high voltage batteries such as are used in electrical vehicles.

BACKGROUND OF THE INVENTION

Many prior art schemes for charging batteries are well known. These include constant voltage and constant current charging schemes and trickle charging once the battery is sufficiently charged. Most prior art schemes used some sort of timed charging scheme based on an average battery's behavior characteristics, such as the battery voltage at the start of charging. These prior art methods adjust charging voltage based on the temperature, the change in temperature with respect to time, or voltage change with respect to time in the battery. At the start of charging prior art methods have employed a constant voltage or constant current output at a preset level. While the prior art methods will eventually charge a battery the charging schemes in the prior art do not attempt to optimize the charging time and power consumption of the battery to be charged.

This is particularly important in electrical vehicle applications where relatively large capacity batteries will regularly need to be charged in a fast, efficient manner. Since the large capacity batteries of an electric vehicle require a power level near the limit of the supply, care must also be given not to exceed the maximum power limit available or damage could occur. On the other hand, the power limit delivered should be as high as possible to quickly charge the battery.

What is needed is a charging method and system for minimizing the amount of time needed to charge a battery and maximizing the amount of power delivered to the battery at any time during charging.

BRIEF DESCRIPTION OF THE DRAWINGS

For a more complete understanding of the present invention reference should be made to the drawings, where.

DETAILED DESCRIPTION OF A PREFERRED EMBODIMENT

Figure 1:
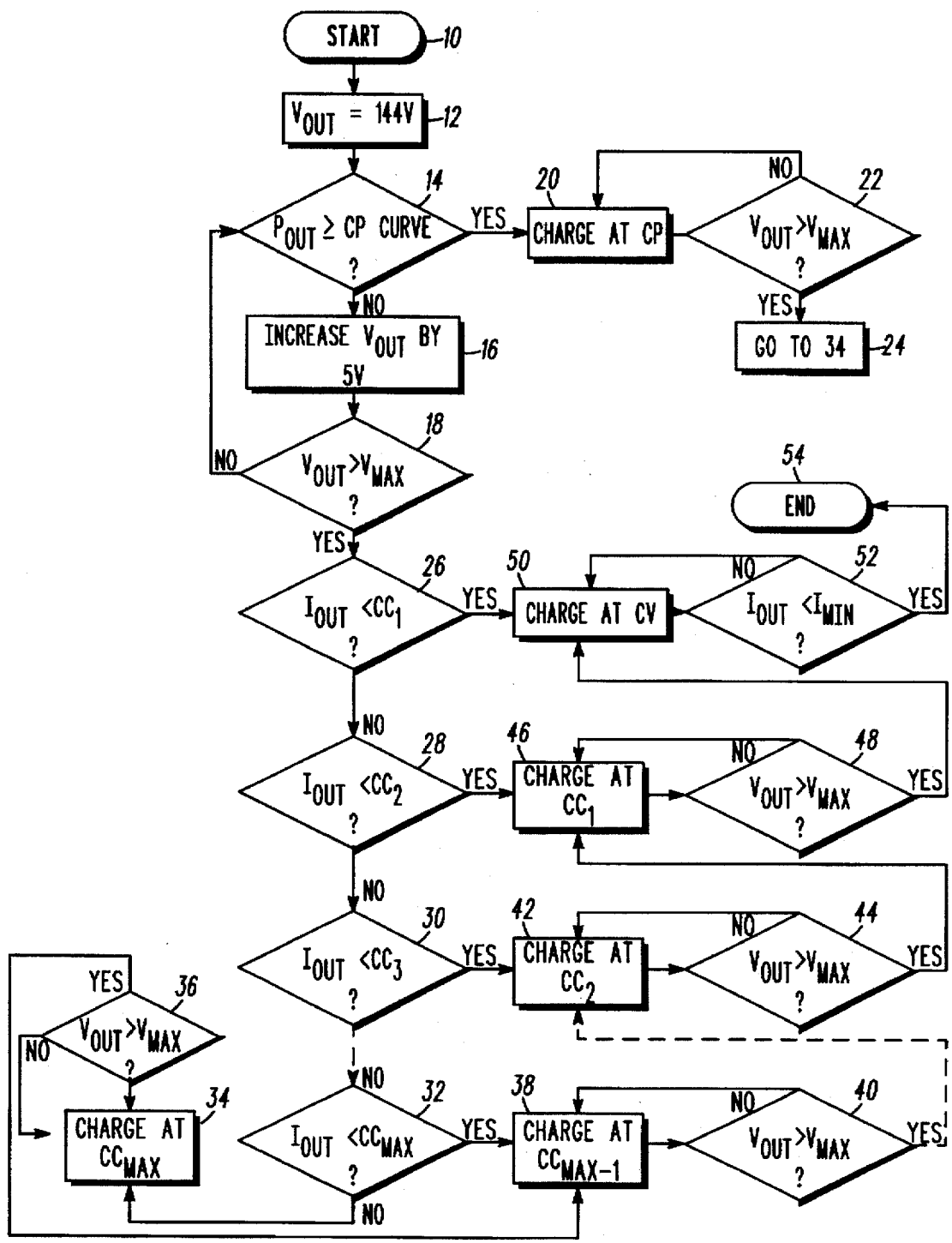
FIG. 1 is a flowchart illustrating a charging method in accordance with the present invention.

FIG. 1 illustrates a preferred method of charging a battery in accordance with the present invention. The method starts at step 10 and begins applying a predetermined voltage to a battery to be charged at step 12. In the example shown the predetermined voltage is 144V, which is a typical starting point for batteries used in electrical vehicles. Step 14 then determines if the power output of a charging system (explained in detail below) is greater than or equal to a constant power curve, which represents the maximum available power from the charging system. If step 14 is NO, step 16 increases the voltage applied to the battery by some predetermined amount, in this example 5V, to a known maximum battery charging voltage. Step 18 then determines if the voltage applied to the battery ($V_{out}$) is greater than the maximum charging voltage of the battery ($V_{max}$). If step 18 is NO, the method loops back to step 14.

Figure 2:
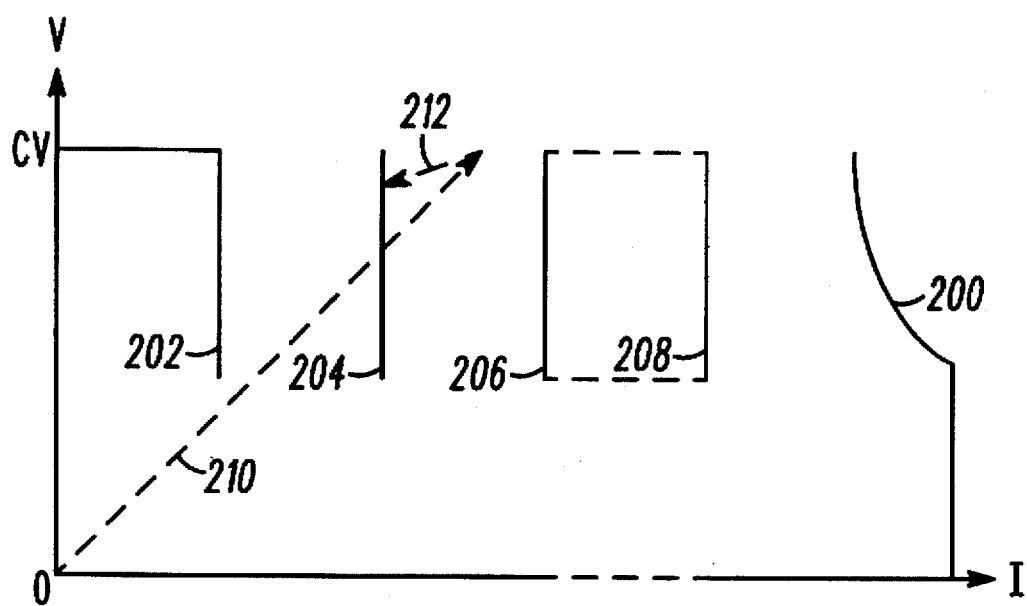
FIG. 2 is a graphical representation of one possible charging sequence in accordance with the present invention.
Figure 3:
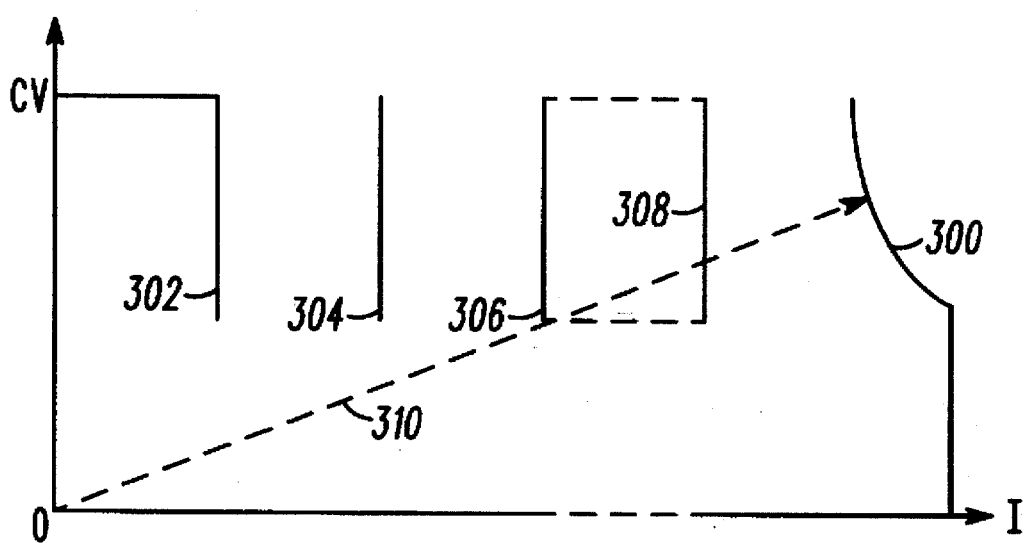
FIG. 3 is a graphical representation of another possible charging sequence in accordance with the present invention.

If step 14 is YES, step 20 begins charging the battery along the constant power curve (CP curve), which can be seen in FIGS. 2 and 3 as curves 200 and 300, respectively. Curves 200 and 300 deliver the maximum possible power to the battery that is available from the charging system. Step 22 of FIG. 1, like step 18, determines if $V_{out} > V_{max}$ and charges the battery along the CP curve until $V_{max}$ is reached. Once the maximum battery charging voltage is reached step 24 causes the program to jump to step 34.

If step 18 is YES, the method measures a current supplied to the battery at the maximum battery charging voltage and makes a series of decisions as to whether the current being supplied to the battery ($I_{out}$) is below each of a predetermined set of constant current charging levels (CCCLs) that are supplied to the charging system. As those skilled in the art know these CCCLs are supplied by the battery manufacturer and are different for each type and brand of battery. The CCCLs reflect the levels at which the battery being charged accepts a charge the fastest while at the same time maximizing the useful battery life. As those skilled in the art appreciate, it is generally true that the more power that is applied to the battery the faster the battery will charge; however, the battery will be damaged and its useful life shortened if too much power is applied to the battery. As explained below in detail the method sets a charging current level approximately equal to one of the set of predetermined constant current charging levels based on the current supplied to the battery at the maximum battery charging voltage for minimizing an amount of time needed to charge the battery and maximizing a useful life of the battery.

Step 26 determines if $I_{out}$ is less than the lowest CCCL ($CC_1$ which is line 202 in FIG. 2 and line 302 in FIG. 3). If step 26 is NO, step 28 makes a similar determination for the second lowest CCCL ($CC_2$, 204 and 304). This same type of determination is made at steps 30 for lines 206 and 306 and so on to step 32 where the determination is if $I_{out} < CC_{max}$, which are lines 208 and 308 in FIGS. 2 and 3, respectively. If the current supplied to the battery is not less than the highest CCCL step 34 charges the battery at the highest CCCL until $V_{max}$ is reached at step 36.

Once step 36 is YES, step 38 causes the system to step down to a successively lower constant current charging level after the voltage supplied to the battery has reached the maximum battery charging voltage. Step 40 then causes step 38 to continue charging the battery until $V_{out} > V_{max}$. Once step 40 is YES, the method steps down to the next lower CCCL ($CC_2$, 204, and 304) until step 42 charges the battery to $V_{max}$, where step 44 causes the system to charge at the lowest CCCL ($CC_1$, 202, and 302), at step 46. Once step 48 is YES, step 50 causes the system to trickle charge at constant voltage level, CV, which is typically equal to $V_{max}$. Step 52 then determines when the current drawn by the battery drops below a minimum current level, $I_{min}$. Once step 52 is YES, step 54 causes the method to end and the charging stops.

As those skilled in the art will appreciate the CCCL at which the battery is first charged depends on the level of charge existing at the start. The more charge in the battery, the lower the beginning CCCL. If the current supplied to the battery is less than any one of the CCCLs at steps 28, 30, or 32 the method will cause the system to step down to the closest lower CCCL at steps 46, 42, and 38, respectively. If $I_{out}$ is less than the lowest CCCL at step 26 then step 50 causes the battery to be trickle charged at CV. This process is best understood in conjunction with the two charging examples shown in FIGS. 2 and 3.

FIG. 2 illustrates one possible charging sequence. Dashed line 210 represents one possible response curve of a battery where the current drawn by the battery at the $V_{max}$ level CV is less than CCCL 206 but greater than CCCL 204. Therefore, the system causes the battery to begin charging along CCCL 204, as illustrated by dashed line 212. The battery will then be charged at CCCL 204 until the CV level is reached whereupon the system will step down to CCCL 202 to continue charging the battery. Once the CV level is reached again the system will switch to trickle charging until the battery is fully charged.

FIG. 3 discloses another possible charging sequence where dashed line 310 shows that the battery is sufficiently discharged such that the battery draws the maximum power available from the system and is therefore charge along line 300 until the CV level is reached. The sequence of charging steps will progress successively down to CCCL 308, 306, 304, 302, and finally to trickle charge along the CV level.

Figure 4:
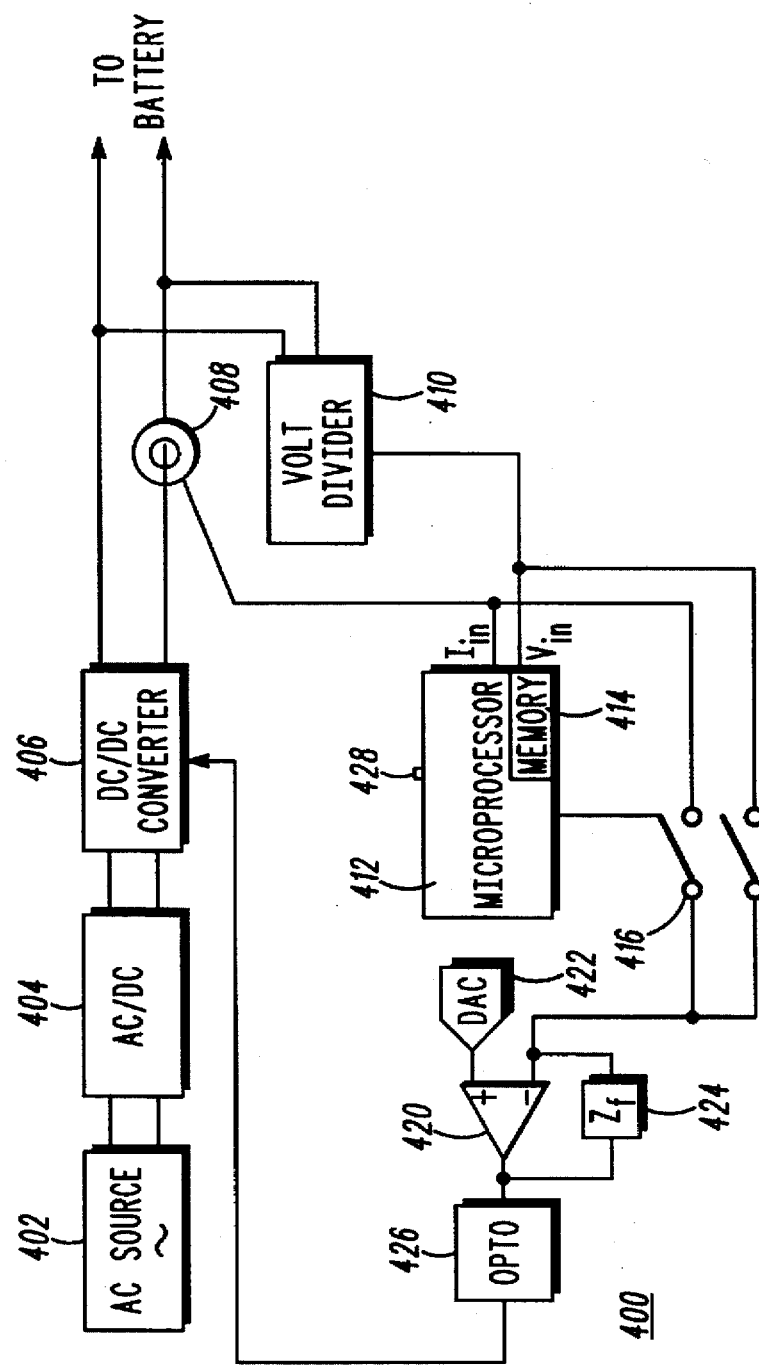
FIG. 4 is a block diagram of a system in accordance with the present invention.

FIG. 4 discloses a charging system 400 in accordance with the present invention. The system 400 includes a power source 402, in this case an alternating current (AC) source. The AC power is converted to direct current (DC) by AC/DC converter 404 and is then converted again by DC/DC converter 406 to regulate the amount of power applied to the battery. The system 400 also has control circuitry, for controlling the amount of power converter 406 supplies to the battery. The control circuitry includes a current sensor 408 for measuring the amount of current supplied to the battery, a voltage divider 410 for measuring the voltage of the battery, and a microprocessor 412, having a memory 414 having inputs from current sensor 408 and voltage divider 410. Microprocessor 412 then controls the charging of the battery according to the method described above based on the CCCLs and CV level stored in memory 414 for the particular battery being charged and the ever-changing current and voltage levels applied to the battery during charging. Microprocessor 412 maintains the proper current or voltage level applied to the battery by manipulating switches 416, 418, which control the amplifier 420, and the digital-to-analog converter (DAC) 422. As those skilled in the art will appreciate the amplifier 420 includes some feedback impedance $Z_f$, as shown in box 424. In addition, an opto-isolator 426 is desirable to provide safety protection to the user by electrically isolating the AC source 402 from the DC output of converter 406.

Figure 5:
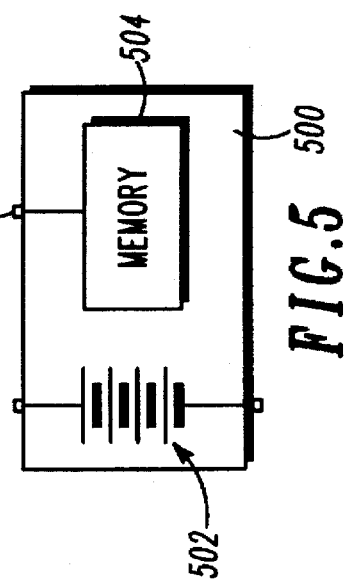
FIG. 5 is a block diagram of a battery in accordance with the present invention.

Finally, FIG. 5 discloses a preferred battery 500, which includes cells 502 and a memory 504. The memory 504 preferably includes all the data representing the CCCLs and the CV level of the battery 500. The data can then be transferred from memory 504 through terminal 506 to the microprocessor 412 and terminal 428. This provides the distinct advantage of allowing the system 400 to be configured to charge any type of battery without the need to have the relevant data permanently stored in memory 414.

In conclusion, the method and system disclosed above allows a battery to be charge in an efficient, timely manner without causing undo damage to the battery.

What is claimed is:

1. A method for controlling battery charging comprising the steps of:

applying a predetermined voltage to a battery to be charged;

increasing the voltage applied to the battery to a known maximum battery charging voltage;

measuring a current supplied to the battery at the maximum battery charging voltage;

supplying a predetermined set of constant current charging levels to be stored in a memory of the battery;

setting a charging current level approximately equal to one of the set of predetermined constant current charging levels based on the current supplied to the battery at the maximum battery charging voltage for minimizing an amount of time needed to charge the battery and maximizing a useful life of the battery; and charging the battery at one of a highest constant current charging level not exceeding the maximum charging voltage or the maximum power level not exceeding the maximum charging voltage, whichever supplies the greatest amount of current.

2. The method of claim 1 further including the step of stepping down to a successively lower constant current charging level after the voltage supplied to the battery has again reached the maximum battery charging voltage.

3. The method of claim 2 further including the step of charging the battery at the maximum battery charging voltage after the maximum battery charging voltage has again been reached at a lowest constant current charging level.

4. The method of claim 1 further including the step of controlling the battery charging with a microprocessor.

5. The method of claim 4 further including the step of storing the set of constant current charging levels in a memory of the microprocessor.

6. A system for controlling battery charging comprising:

a charging voltage supply for supplying a voltage to a battery to be charged;

voltage control circuitry for increasing the voltage supplied to the battery to a known maximum battery charging voltage;

a current meter for measuring a current supplied to the battery at the maximum battery charging voltage;

current control circuitry for setting a charging current level approximately equal to one of a set of predetermined constant current charging levels based on the current supplied to the battery at the maximum battery charging voltage for minimizing an amount of time needed to charge the battery and maximizing a useful life of the battery; and wherein the current control circuitry further includes charge level selection means for charging the battery at one of a highest constant current charging level not exceeding the maximum charging voltage or the maximum power level without exceeding the maximum charging voltage, whichever supplies the greatest amount of current.

7. The system of claim 6, the charge level selection means further including means of stepping down to a successively lower constant current charging level after the voltage supplied to the battery again reaches the maximum battery charging voltage.

8. The system of claim 7 further including trickle charge means for charging the battery at the maximum battery charging voltage after the maximum battery charging voltage has again been reached at a lowest constant current charging level.

9. The system of claim 6 further including a microprocessor for controlling the battery charging.

10. The system of claim 9 further including a memory for storing the set of constant current charging levels.

11. The system of claim 10 further including a memory associated with the battery for supplying the set of constant current charging levels to the system.

12. A method for controlling battery charging with a microprocessor comprising the steps of:

applying a predetermined voltage to a battery to be charged;

storing a predetermined set of constant current charging levels and a maximum battery charging voltage in a memory of the microprocessor;

increasing the voltage applied to the battery to the maximum battery charging voltage;

measuring a current supplied to the battery at the maximum battery charging voltage;

setting a charging current level approximately equal to one of a highest constant current charging level not exceeding the maximum charging voltage or a maximum power level not exceeding the maximum charging voltage, whichever supplies the greatest amount of current to the battery for minimizing an amount of time needed to charge the battery and maximizing a useful life of the battery; and stepping down to a successively lower constant current charging level after the voltage supplied to the battery again reaches the maximum battery charging voltage.

13. A method for controlling battery charging comprising the steps of:

applying a predetermined voltage to a battery to be charged;

increasing the voltage applied to the battery to a known maximum battery charging voltage;

measuring a current supplied to the battery at the maximum battery charging voltage;

supplying a predetermined set of constant current charging levels to be stored in a memory of the battery;

setting a charging current level approximately equal to one of the set of predetermined constant current charging levels based on the current supplied to the battery at the maximum battery charging voltage for minimizing an amount of time needed to charge the battery and maximizing a useful life of the battery; and setting the constant current charging level to a highest one of the predetermined set of constant current charging levels that is less than the measured current at the maximum battery charging voltage.

* * * * *